Patented Apr. 27, 1937

2,078,516

UNITED STATES PATENT OFFICE

2,078,516

PROCESS OF TREATING ACID LIQUORS

Anton Johan Tulleners, Amsterdam, Netherlands, assignor to Shell Development Company, San Francisco, Calif., a corporation of Delaware No Drawing. Application June 17, 1935, Serial No. 27,048. In the Netherlands July 3, 1934

12 Claims. (Cl. 260—99.12)

This invention relates to a process for selectively separating free acid from mixtures containing free acid and acid alkyl esters, which mixtures are called "acid liquors", and it is particularly concerned with a process for treating absorption products of olefines in acids whereby the excess of acid may be removed from the absorption product in a simple way. More particularly it comprises a process for selectively removing free acid from acid liquor by extraction with a solvent medium for the free acid.

My invention may be practised with any suitable olefine-acid absorption product regardless of its source or olefine content. As suitable starting material for the preparation of such absorption products, hydrocarbons derived from mineral oils as petroleum, shale oil, and the like, or from natural gas or from coal, peat, and like carboniferous natural materials, may be used, as well as those derived from animal or vegetable oils, fats and waxes. The olefines present in such starting material may be of natural occurrence, the result of a dehydrogenation, distillation, vapor or liquid phase cracking, or other pyrogenetic treatment. The olefines may be applied in a pure state, either as individual olefines or pure olefinic mixtures, or in admixture with paraffins or other compounds which may be considered as inert in the absorption process, the number of carbon atoms in the olefine molecules being preferably at least five. Furthermore, such olefines may comprise hydrocarbon fractions consisting of, or predominating in, hydrocarbons containing the same number of carbon atoms to the molecule, or of mixtures of non-isomeric hydrocarbons.

Suitable acids which may be used as absorption media for olefines in the preparation of the acid liquors to which my invention is applicable are: inorganic acids, of which hydrochloric, sulfuric, pyrosulfuric, phosphoric, pyrophosphoric, and the like are typical; and organic acids, such as benzene sulfonic acid, naphthalene sulfonic acid, and homologues and analogues thereof. The concentrations in which such acids are customarily used for the absorption of olefines vary widely depending upon the olefine or olefines involved, their concentration, and the temperature at which the absorption is carried out. In all cases of industrial importance, however, an excess of acid is used to promote rapid olefine absorption, and free acid is present in the resulting product together with alkyl acid esters and/or neutral alkyl esters thereof and/or the corresponding alcohols. Such products are defined in this specification and the following claims by the expression "absorption products".

I have found that the free acid content of such absorption products may be selectively separated, practically quantitatively, by washing with a small amount of a solvent medium for the free acid.

For the purpose of affording a clear understanding of my invention, but without imposing limitation thereon, it will be described with more particular reference to the treatment of acid liquors prepared by absorbing olefines in sulfuric acid. However, the acid liquors may also have been prepared otherwise, for example by treating alcohols or unsaturated organic acids with sulfuric acid.

It has been a general practice in the prior art to dilute such acid liquors with varying, relatively large, amounts of water for the preparation of hydrated olefine products, particularly alcohols. Such practice has always involved such excessive dilution, however, that substantial amounts of the alkyl sulfuric acid present remain admixed with the free sulfuric acid. It has been necessary, therefore, either to neutralize such free acid or to carry out the further treatment of the alkyl sulfuric acid in an acid medium.

Now I have found that when various amounts of water are successively added to an acid liquor, the free sulfuric acid is dissolved first and the monoalkyl sulfate is dissolved only after the addition of larger amounts of water. Upon the first addition of a small amount of water two layers are formed: an aqueous bottom layer containing highly concentrated sulfuric acid, and a top layer containing the remainder of the absorption product. After a further addition of water, a homogeneous phase is formed. A second separation into two layers occurs only upon the addition of larger quantities of water; the aqueous bottom layer in this case containing alkyl sulfuric acid in addition to free sulfuric acid, and the top layer containing dialkyl sulfate and polymers together with dissolved paraffins and unreacted olefines, when such are present in the absorption product.

By isolating the first aqueous layer, separated out after the addition of a small quantity of water, the free acid may be practically entirely removed. The alkyl acid esters, substantially free from acid, may then be separated from the neutral esters, polymers, etc. present by further dilution of the remaining absorption products with any of the above solvent media if desired.

There appears to be a rather sharp limit between the quantity of water sufficient to dissolve the sulfuric acid and that in which the alkyl sulfuric acid begins to dissolve. The quantity of water required for selective removal of the free acid depends upon the nature of the absorption product and is preferably determined in advance by experiment. As a rule it varies between about 10 and about 20% of the weight of the absorption product treated.

In carrying out my invention several alternative procedures may be used for each of the steps involved. The process may be carried out continuously intermittently, or batch wise and one or more selective acid extractions may be made. The absorption product may be contacted with the aqueous extraction medium in any suitable manner. For example, resort may be had to agitation of the two agents in a common vessel, or to countercurrent flow and the like. Injection of the aqueous medium as an atomized spray may be used to promote intimate contact. The temperature may be controlled to avoid hydrolysis of the alkyl acid esters, either by cooling of the mixture during treatment and/or by thorough precooling of either or both of the components. The separation of the resulting phases is readily accomplished by any of the usual methods for the separation of immiscible liquids, such as centrifugation, settling and decantation and the like.

Suitable aqueous media for effecting the selective removal of free acid from acid liquors include, in addition to water itself, water to which a little alcohol or ether has been added, aqueous salt solutions such as brine, sodium sulfate solutions, and the like, or aqueous alkaline solutions or dilute aqueous acid solutions. A salt solution is preferably applied only in the case of sulfuric acid esters derived from unsaturated hydrocarbons with less than approximately ten carbon atoms in the molecule.

The following detailed example illustrates one modification of my invention as applied to the treatment of an absorption product of higher olefines in strong sulfuric acid. But it will be understood that many other embodiments of this invention may be made without departing from the spirit thereof and that by suitable adjustment of reagents a great variety of other olefine absorption products, particularly absorption products of olefines with at least five carbon atoms in the molecule, may be analogously treated.

Example I

An olefine absorption product was prepared as follows: a fraction of vapor phase cracked solid paraffin wax having a boiling range of 160 to 220° C. and a bromine number of 94 (determined by the method of McIlhiney) was treated for one hour at about 25 to 30° C., while thoroughly stirred, with an equimolecular quantity calculated on the bromine number, of 90% sulfuric acid.

The resulting absorption product was separated from the unabsorbed hydrocarbons and treated with about 10% by weight of ice water. After treatment the mixture was allowed to stratify and the two resulting layers separated. The bottom layer was found to be a 63% solution of sulfuric acid substantially free from alkyl sulfates. This solution was found to represent about 93% of the free sulfuric acid present in the absorption product prior to the dilution with water.

The following detailed example illustrates one modification as applied to the treatment of a reaction product of higher alcohols with strong sulfuric acid.

Example II

To 1000 parts by weight of a commercial primary hexadecyl alcohol (acetyl saponification figure 194, melting point 40° C.) there was added in 30 minutes, at a temperature of 42–57° C., 632 parts by weight of 96% $H_2SO_4$, whereupon the mixture was stirred for another 4 hours. Per 90 parts by weight of reaction mixture 10 parts by weight of water and 6.7 parts by weight of ethyl alcohol were then added. After having been allowed to stand for some time the mixture separated into two layers, whereby as bottom layer were obtained 26 parts by weight of a 56% sulfuric acid solution. The quantity of free sulfuric acid separated from the absorption product amounted to 73% (calculated on the free sulfuric acid present in the absorption product).

My process offers many advantages. It permits the recovery of the excess acid present in olefine absorption products, in a form sufficiently concentrated for direct use in many processes or for economical regeneration of the absorption medium. As an additional advantage of my process, coloring constituents present in the absorption product are removed in the aqueous layer simultaneously with the free acid and the appearance of the conversion products of the remaining alkyl esters is correspondingly improved.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. The process of treating mixtures containing free mineral acid acting acid and alkyl acid esters of said acid, the alkyl radicle of which contains at least five carbon atoms, which comprises selectively extracting essentially free acid therefrom by adding thereto an aqueous solvent medium for the free acid having a water content not greater than about 20% of the weight of said mixture and separating the resulting product into an aqueous phase containing said acid and a phase containing substantially the alkyl acid ester content of the original mixture prior to working up the acid liquors.

2. The process of treating acid reaction products of aliphatic alcohols containing at least five carbon atoms and mineral acid acting acids, which comprises selectively extracting essentially free acid therefrom by adding thereto an aqueous solvent medium having a water content not greater than about 20% of the weight of said reaction product and separating the resulting mixture into an aqueous phase containing said acid and a phase containing substantially the alkyl acid ester content of the original reaction product prior to working up the reaction products.

3. The process of treating absorption products of olefines containing at least five carbon atoms in mineral acid acting acids, which comprises dilution thereof with an aqueous medium of a water content not greater than about 20% of the weight of said absorption product and separating the resulting mixture into an aqueous phase containing said acid and a phase containing substantially the alkyl acid ester content of the original absorption product.

4. The process of treating absorption products in accordance with claim 3, in which the dilution is carried out with an aqueous medium of a water content of about 10% to about 20% of the weight of the absorption product.

5. The process of treating absorption products of olefines containing at least five carbon atoms in mineral acid acting acids, which comprises selectively removing essentially free acid therefrom by adding thereto not more than about 20% by weight of water and separating the resulting mixture into an aqueous phase containing said acid and a phase containing substantially the alkyl acid ester content of the original absorption product.

6. The process of treating absorption products of olefines containing at least five carbon atoms in sulfuric acid, which comprises selectively removing essentially free sulfuric acid therefrom by adding thereto an aqueous medium having a water content not greater than about 20% of the weight of said absorption product and separating the resulting mixture into an aqueous phase containing the sulfuric acid and a phase containing substantially the alkyl hydrogen sulfate content of the original absorption product prior to working up the absorption products.

7. The process of treating absorption products of olefines containing at least five carbon atoms in sulfuric acid, which comprises selectively removing essentially free sulfuric acid therefrom by adding thereto between about 10% to about 20% by weight of water, and separating the resulting mixture into an aqueous phase containing sulfuric acid and a phase containing substantially the alkyl hydrogen sulfate content of the original absorption product.

8. The process of treating absorption products of secondary-base olefines containing at least five carbon atoms in mineral acid acting acids, which comprises selectively removing essentially free acid therefrom by adding thereto not more than about 20% by weight of water and separating the resulting mixture into an aqueous phase containing said acid and a phase containing substantially the alkyl acid ester content of the original absorption product.

9. The process of treating absorption products of secondary-base olefines containing at least five carbon atoms in sulfuric acid, which comprises selectively removing essentially free sulfuric acid therefrom by adding thereto between about 10% to about 20% by weight of water, and separating the resulting mixture into an aqueous phase containing sulfuric acid and a phase containing substantially the alkyl hydrogen sulfate content of the original absorption product.

10. In a process of treating absorption products of olefines containing at least five carbon atoms in mineral acid acting acids, the steps of selectively removing alkyl acid esters from neutral alkyl esters, which comprise first substantially reducing the free acid content of the mixture by adding thereto not more than about 20% by weight of water, stratifying the resulting mixture into a lower phase containing said acid and an upper phase containing substantially the alkyl acid and neutral ester content of the original absorption product, separating said phases and then extracting the alkyl acid esters from said separated upper phase with an aqueous medium.

11. In a process of treating absorption products of olefines containing at least five carbon atoms in sulfuric acid, the steps of selectively removing alkyl acid sulfates from dialkyl sulfates, which comprise first substantially reducing the free sulfuric acid content of the mixture by adding thereto between about 10% to about 20% by weight of water, stratifying the resulting mixture into a phase containing sulfuric acid and a phase containing substantially the alkyl sulfate content of the original absorption product, separating said phases and then extracting the alkyl acid sulfates from said separated alkyl sulfate phase with an aqueous medium.

12. In a process of treating absorption products of olefines containing at least five carbon atoms in mineral acid acting acids, the steps of selectively removing alkyl acid esters from neutral alkyl esters, which comprise first substantially reducing the free acid content of the mixture by adding thereto not more than about 20% by weight of water, stratifying the resulting mixture into a lower phase containing said acid and an upper phase containing substantially the alkyl acid and neutral ester content of the original absorption product, separating said phases and then extracting the alkyl acid esters from said separated upper phase with an additional amount of water.

ANTON JOHAN TULLENERS.